(12) United States Patent
Coffinberry

(10) Patent No.: US 7,059,136 B2
(45) Date of Patent: Jun. 13, 2006

(54) AIR TURBINE POWERED ACCESSORY

(75) Inventor: George Albert Coffinberry, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/927,993

(22) Filed: Aug. 27, 2004

(65) Prior Publication Data

US 2006/0042227 A1   Mar. 2, 2006

(51) Int. Cl.
*F02C 6/04* (2006.01)

(52) U.S. Cl. ............... 60/785; 60/787; 60/39.183; 60/226.1

(58) Field of Classification Search ........... 60/226.1, 60/262, 761, 762, 269, 767, 784, 786, 787, 60/39.15, 39.183
See application file for complete search history.

(56) References Cited

U.S. PATENT DOCUMENTS

| | | | |
|---|---|---|---|
| 4,050,242 A | 9/1977 | Dusa | |
| 4,137,708 A | 2/1979 | Aspinwall et al. | |
| 4,185,457 A | 1/1980 | Parker et al. | |
| 4,374,469 A * | 2/1983 | Rannenberg | 62/402 |
| 4,380,893 A | 4/1983 | Stokes et al. | |
| 4,523,517 A | 6/1985 | Cronin | |
| 4,967,565 A | 11/1990 | Thomson et al. | |
| 5,014,518 A | 5/1991 | Thomson et al. | |
| 5,136,837 A * | 8/1992 | Davison | 60/785 |
| 5,137,230 A * | 8/1992 | Coffinberry | 244/118.5 |
| 5,235,803 A | 8/1993 | Rodgers | |
| 5,343,692 A * | 9/1994 | Thomson et al. | 60/785 |
| 5,373,691 A | 12/1994 | Gardner et al. | |
| 5,442,905 A * | 8/1995 | Claeys et al. | 60/785 |
| 5,452,573 A * | 9/1995 | Glickstein et al. | 60/782 |
| 5,511,374 A * | 4/1996 | Glickstein et al. | 60/782 |
| 5,694,768 A | 12/1997 | Johnson et al. | |
| 5,939,800 A | 8/1999 | Artinian et al. | |
| 6,058,715 A * | 5/2000 | Strang et al. | 62/87 |
| 6,124,646 A * | 9/2000 | Artinian et al. | 290/52 |
| 6,250,097 B1 * | 6/2001 | Lui et al. | 62/402 |
| 6,270,309 B1 | 8/2001 | Ghetzler et al. | |
| 6,283,410 B1 * | 9/2001 | Thompson | 244/59 |
| 6,305,156 B1 * | 10/2001 | Lui | 60/785 |

(Continued)

FOREIGN PATENT DOCUMENTS

FR   2851295   2/2003

(Continued)

*Primary Examiner*—William H. Rodriguez
(74) *Attorney, Agent, or Firm*—William Scott Andes; Steven J. Rosen

(57) ABSTRACT

An aircraft accessory system includes an aircraft engine powered direct air turbine driven accessory and an air turbine drivingly directly connected by an air turbine shaft to the accessory. The air turbine includes a variable geometry turbine nozzle in selectable direct flow communication with at least two compressed engine air sources. The two compressed engine air sources may be an HPC interstage bleed and an HPC compressor discharge stage bleed. The variable geometry turbine nozzle may be in selectable direct flow communication with a third compressed engine air source such as a bypass duct or an engine inlet duct. The air turbine includes a turbine exit which may be in selectable direct flow communication with at least two relatively lower pressure engine air sinks. The air sinks may be located in the aft end of a bypass duct and in a divergent section of the exhaust nozzle.

44 Claims, 7 Drawing Sheets

U.S. PATENT DOCUMENTS

| | | |
|---|---|---|
| 6,390,772 B1 | 5/2002 | Dziorny et al. |
| 6,505,474 B1 * | 1/2003 | Sauterleute et al. .......... 62/172 |
| 6,668,542 B1 | 12/2003 | Baker et al. |
| 6,676,379 B1 | 1/2004 | Eccles et al. |
| 2002/0166318 A1 | 11/2002 | Baker et al. |
| 2003/0038553 A1 | 2/2003 | Andres et al. |
| 2003/0108426 A1 | 6/2003 | Eccles et al. |
| 2004/0014419 A1 | 1/2004 | Lents et al. |

FOREIGN PATENT DOCUMENTS

| | | |
|---|---|---|
| GB | 768546 | 2/1953 |
| GB | 957573 | 5/1962 |

* cited by examiner

AIR TURBINE POWERED ACCESSORY

BACKGROUND OF THE INVENTION

Field of the Invention

The present invention relates generally to aircraft engine powered accessories such as an electrical power generator for aircraft powered by gas turbine engines and, more particularly, to such accessories and electrical generators powered by air turbines or motors.

Jet engine powered aircraft have main aircraft electrical generators to power electrical equipment on-board the aircraft and engine. Gearbox-driven integrated drive generator systems (IDGS) and older constant speed drive (CSD) generators have typically been used for aircraft electric power in the past. Gearbox-driven variable speed constant frequency (VSCF) generators have been more recently developed and have replaced the IDGS in some aircraft. The IDGS uses a hydraulic-actuated variable-speed planetary gearing system to maintain a constant generator speed and, hence, constant electrical frequency with varying engine speed. The VSCF uses a direct-drive generator and an electrical controller to maintain constant electrical frequency.

Military aircraft requirements for aircraft AC electrical power are typically 114 to 116 volts at 399 to 401 Hz. Some deviation from these tolerances is acceptable since many modern electrical components such as aircraft flight control surface electric motor actuators are not very sensitive to variations from these tolerances. It is important for electrical drive systems to maintain electrical frequency and, as such, electrical frequency is sensed for speed logic in associated controls to account for sudden change in electrical load. Therefore, aircraft electrical generating systems must maintain high standby power. Additional electrical power management complexity is needed for load shedding.

Future high-speed aircraft may require combined-cycle engines which operate as turbo-fan-jets (TJ) up to approximately Mach 3.5 and as pure ramjets (RJ) above Mach 3.5. Such engines will require suitable means for driving a generator when operated in the ramjet mode. Using a gearbox or other type of engine main shaft mechanically driven generator for the RJ operating mode would be very inefficient and gearboxes are heavy and complicated. Hence, an air driven generator driven by the TJ compressor at lower Mach No. and the RJ air inlet duct at higher Mach No is very desirable. For the same reason, it is very desirable for all of the engine accessories (fuel pumps and hydraulic pumps) to also be air driven.

BRIEF DESCRIPTION OF THE INVENTION

An aircraft accessory system includes an aircraft engine powered direct air turbine driven accessory and an air turbine drivingly directly connected by an air turbine shaft to the accessory. The air turbine includes a variable geometry turbine nozzle in selectable direct flow communication with at least two compressed engine air sources. The two compressed engine air sources may be an HPC interstage bleed and an HPC compressor discharge stage bleed. The variable geometry turbine nozzle may be in selectable direct flow communication with a third compressed engine air source such as a bypass duct or an engine inlet duct. The air turbine includes a turbine exit which may be in selectable direct flow communication with at least two relatively lower pressure engine air sinks. The air sinks may be located in the aft end of a bypass duct and in a divergent section of the exhaust nozzle.

Various embodiments of the air turbine driven accessory include but are not limited to constant voltage electrical power generators, constant frequency electrical power generators, and variable speed centrifugal fuel pumps. Various embodiments of the aircraft accessory system with the aircraft engine powered direct air turbine driven accessory directly drivingly connected to the air turbine may be used in an aircraft ramjet engine or in a bypass turbofan engine as well as other aircraft gas turbine engines.

DETAILED DESCRIPTION OF THE INVENTION

Figure 1:
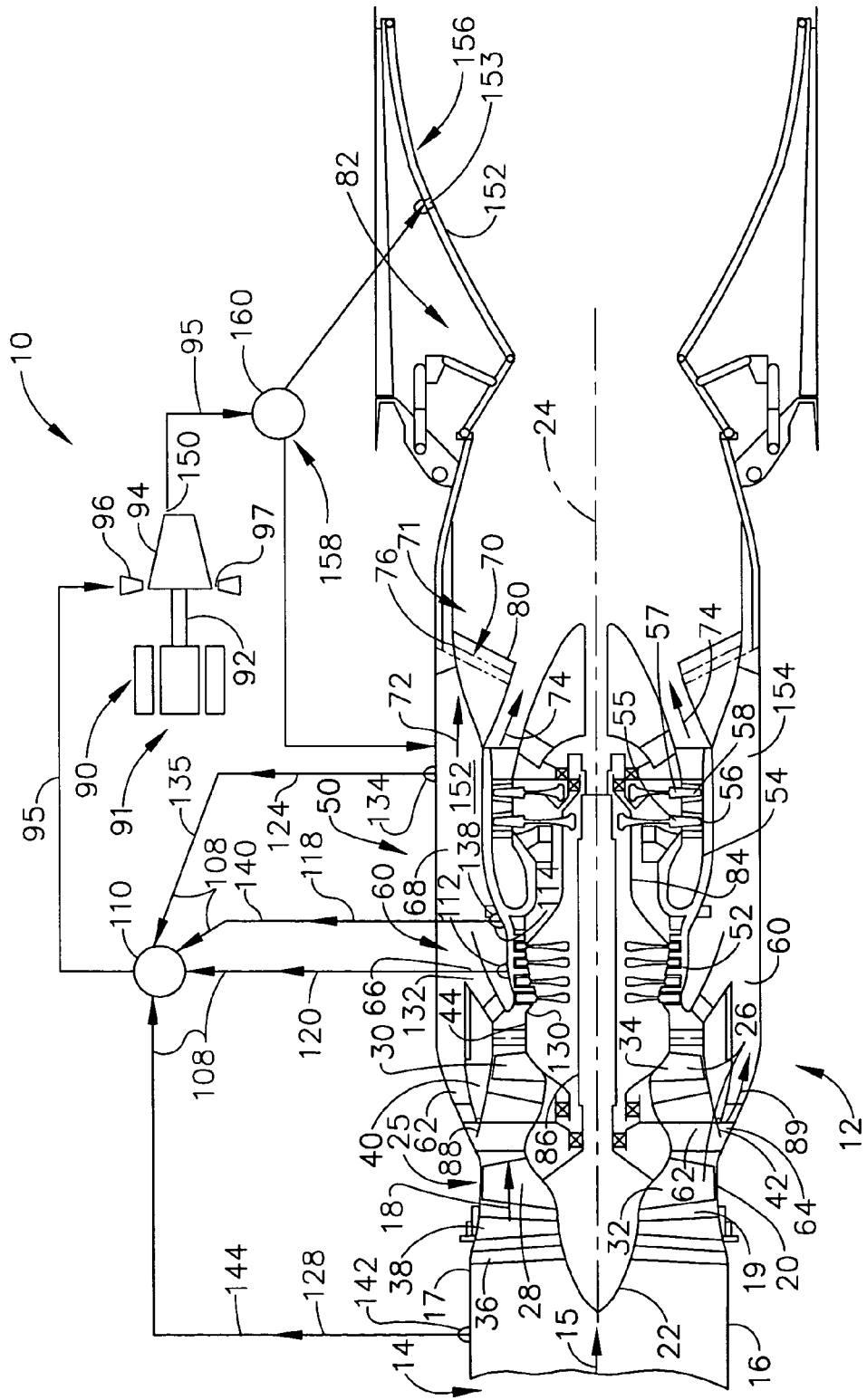
FIG. 1 is a cross-sectional view illustration of a variable cycle turbofan-ramjet engine with a schematically illustrated direct air turbine driven constant frequency generator.

Illustrated in cross-section in FIG. 1 is an exemplary variable cycle turbofan-ramjet engine 12 and a schematically illustrated exemplary aircraft accessory system 10 having a direct air turbine driven constant frequency generator 90 representative of direct air turbine driven accessories 91. The engine 12 includes a single annular engine inlet duct 16 for receiving ambient air (not illustrated in FIG. 1) from outside the aircraft and conveying inlet duct air 15 from the aircraft inlet 14 and ducting it to an engine inlet 17 of the engine 12. A fan duct 19 extends downstream from the engine inlet 17 and is defined between an outer casing 20 and an inner conical hub 22 both disposed concentrically about a longitudinal centerline axis 24 of the engine 12.

A fan section 25 illustrated as split fan assembly 26 including a forward fan 28 disposed in the fan duct 19 and an aft fan 30 is disposed downstream from the forward fan 28 in flow communication therewith. The forward and aft fans 28 and 30 each include a single row of circumferentially spaced apart forward and aft fan blades 32 and 34, respectively. Inlet guide vanes 36 are disposed in the fan duct 19 upstream of the forward fan 28 and extend between the casing 20 and the hub 22, and variable outlet guide vanes 38 are disposed in the fan duct 19 immediately downstream of the forward fan 28 and extending between the hub 22 and the casing 20. The aft fan 30 includes an outer casing 40 defining a flow splitter 42 at an upstream end thereof, and an inner casing 44 spaced radially inwardly from the outer casing 40.

The engine 12 further includes a core engine 50 disposed downstream from the aft fan 30 and in flow communication therewith. The core engine 50 includes in turn a compressor 52, combustor 54, and a high pressure turbine (HPT) 56. Downstream of the HPT 56 is a low pressure turbine (LPT) 58. The exemplary embodiment of the core engine 50 illustrated herein includes a single row of circumferentially spaced HPT turbine blades 55 in the HPT 56 and a single row of circumferentially spaced LPT turbine blades 57 in the LPT 58. The HPT 56 is drivingly connected to the aft fan 30 and the compressor 52 by first rotor shaft 84. The LPT 58 is drivingly connected to the forward fan 28 by a second rotor shaft 86.

A bypass duct 60 circumscribes the aft fan 30 and the core engine 50 and includes a forward bypass duct 62 surrounding the aft fan 30. The bypass duct 60 operates as a ram duct during a ramjet mode of operation of the engine 12. A forward bypass inlet 64 is in selective flow communication with the forward fan 28. The bypass duct 60 includes an intermediate bypass duct 66 disposed between the aft fan 30 and the core engine 50 in flow communication with the aft fan 30. The bypass duct 60 also includes an aft bypass duct 68 surrounding the core engine 50 and in flow communication with both the forward and intermediate bypass ducts 62 and 66. A mode selector valve 88 is disposed in the forward bypass inlet 64 and is operable in an open position which allows a first portion 89 of the inlet duct air 15 from the forward fan 28 to enter the forward bypass duct 62 and in a closed position which prevents air from the forward fan 28 from entering the forward bypass duct 62.

An augmenter 70, which may be referred to as a ram burner since it operates also in the ramjet mode of operation of the engine 12, is disposed in an exhaust duct 71 downstream of both the core engine 50 and the bypass duct 60 and receives bypass air 72 from the bypass duct 60 and core engine combustion discharge gases 74 from the core engine 50. The augmenter 70 includes a plurality of fuel injectors 76 and flameholders 80 disposed downstream from the fuel injectors 76. The augmenter 70 or ram burner is capable of powering the engine in a ramjet mode. A variable area converging-diverging exhaust nozzle 82 is disposed downstream from the augmenter 70 and in flow communication therewith.

The variable cycle engine 12 is designed to operate in a non-bypass mode wherein the mode selector valve 88 is positioned in the closed position and all of the inlet duct air 15 is directed through the forward fan 28 and the aft fan 30 and then through both the intermediate bypass duct 66 and the core engine 50. The variable cycle engine 12 is also designed to operate in a bypass mode wherein the mode selector valve 88 is positioned in the open position and the inlet duct air 15 is directed from the forward fan 28 to both the forward bypass duct 62 and the aft fan 30, and the air from the aft fan 30 is directed to both the intermediate bypass duct 66 and the core engine 50. The variable cycle engine 12 is also designed to operate in a ramjet mode wherein the mode selector valve 88 is positioned in the open position, the core engine 50 is idled or shut down so that little or no combustion occurs in the combustor 54 for powering the HPT 56 and the LPT 58, and the augmenter 70 is activated as a ram burner for burning the bypass air 72 with fuel from the fuel injectors 76 in the ramjet mode of operation.

Figure 2:
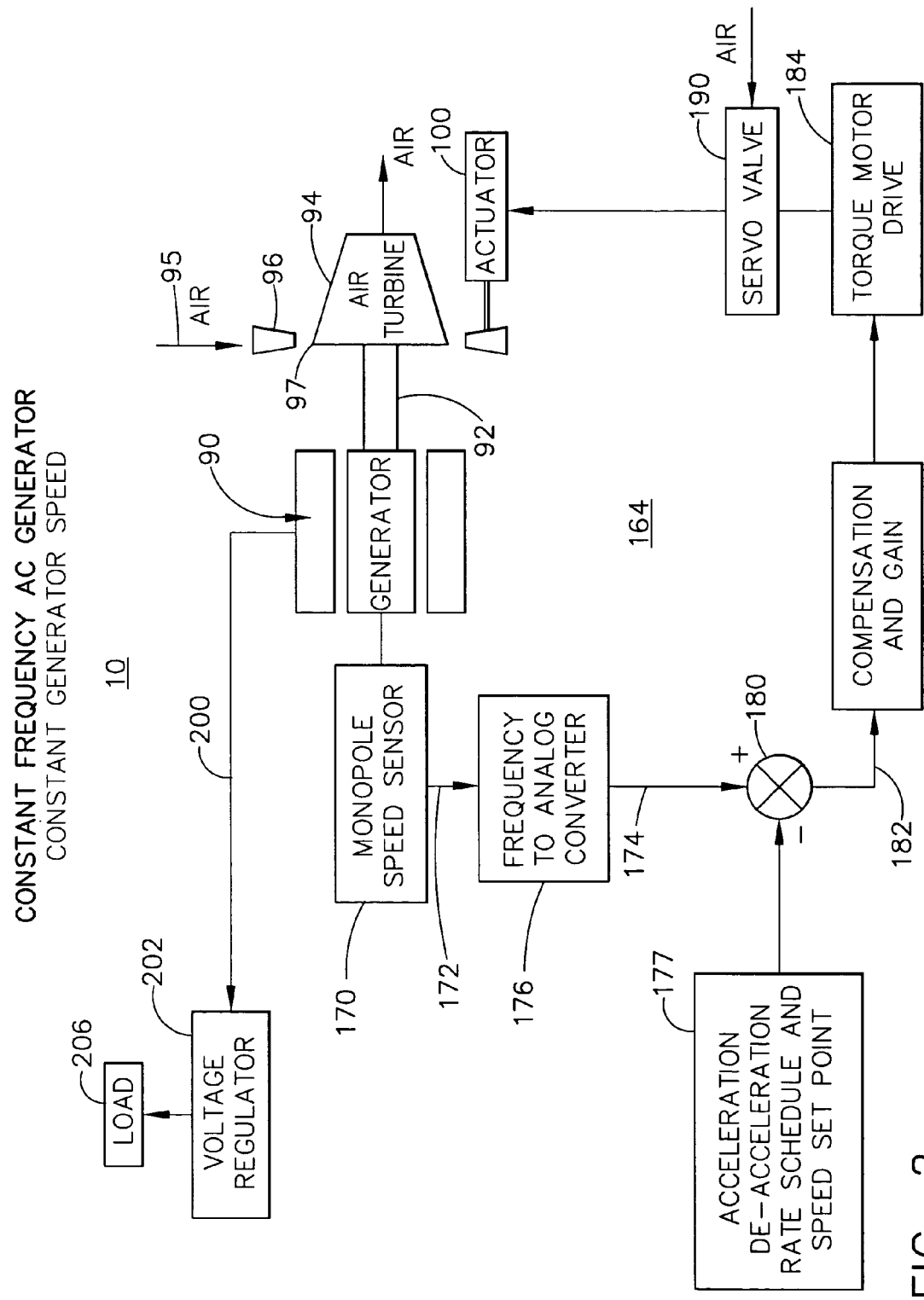
FIG. 2 is a schematical view illustration of an aircraft accessory system with the direct air turbine driven constant frequency generator illustrated in FIG. 1.
Figure 5:
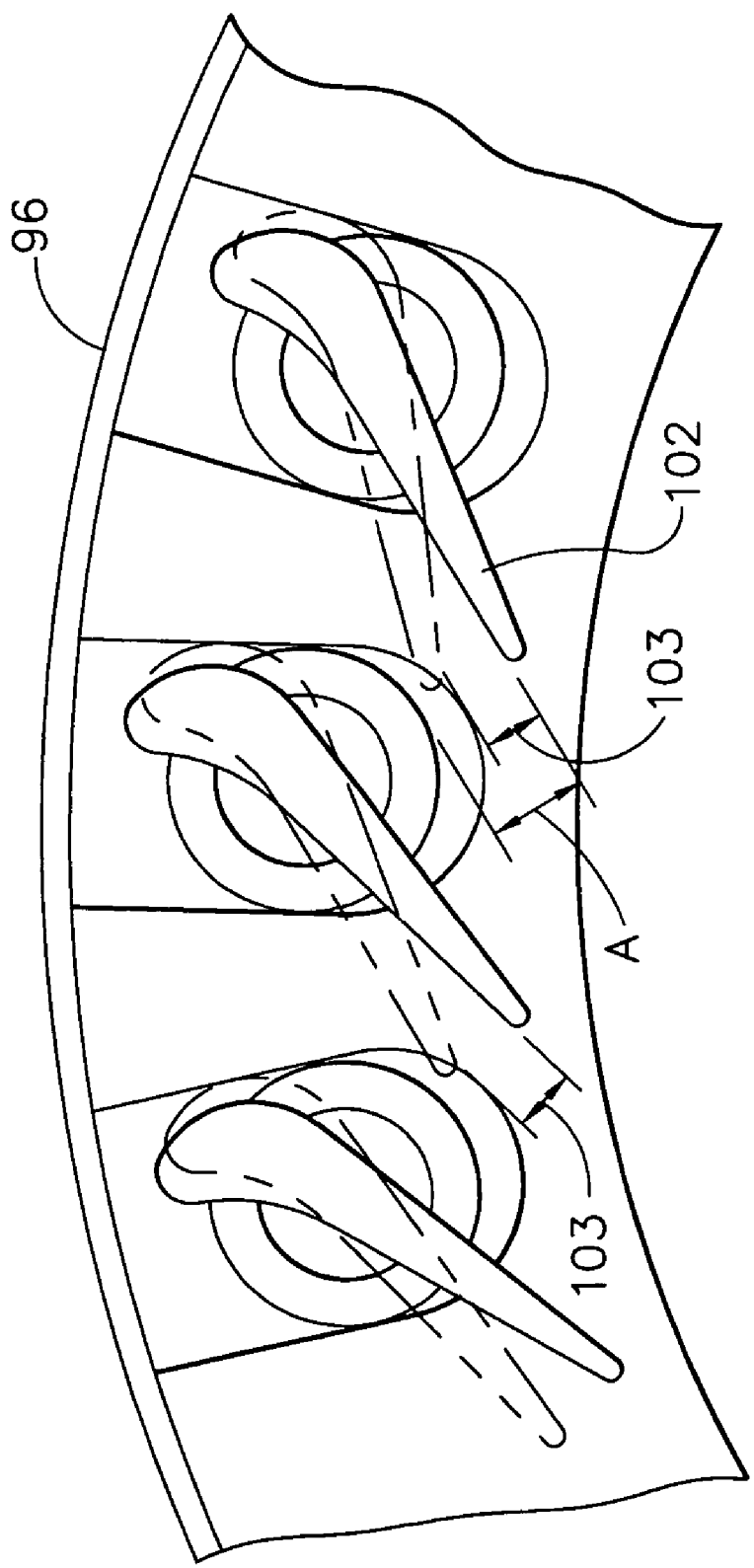
FIG. 5 is a cross-sectional view illustration of variable vanes in a variable geometry turbine nozzle of the air turbine illustrated in FIGS. 1 and 2.

The exemplary aircraft accessory system 10 illustrated in FIGS. 1 and 2, includes a direct air turbine driven constant frequency generator 90 representative of direct air turbine driven accessories. The constant frequency electrical power generator 90 is powered by an air turbine 94 having a variable geometry turbine nozzle 96, more particularly illustrated in FIG. 5, and provides constant-frequency or matched-load electrical power without the need for gearing or a frequency controller. The constant frequency electrical power generator 90 is directly connected by an air turbine shaft 92 to the air turbine 94. In non-ramjet and ramjet engines, the elimination of the gearing or a frequency controller can result in a great savings in weight, space, and cost of the aircraft and engine. When engines operate as pure ramjets (above Mach 3.5) or in a ramjet mode, the core engine 50 is idled or shut down so that little or no combustion occurs in the combustor 54 to power the HPT 56 and the LPT 58. In this turbofan jet operating mode there is not a suitable means available for efficiently operating a gear driven generator. It doesn't appear to make sense to have a gearbox or other type of engine main shaft mechanically driven generator for just the turbofan jet mode and a different system for the ramjet mode.

The variable geometry turbine nozzle 96, located at a turbine inlet 97 to the air turbine 94, is used to control flow through the air turbine 94 and set correct vane discharge area A (see FIG. 5) and, hence, air flow rate needed to satisfy turbine torque required for output power at a specific turbine speed. A pneumatic actuator 100 moves variable vanes 102 and full motion 103 (illustrated in FIG. 5) of the variable vanes 102 may be on the order of one quarter inch. Hence, the mechanical part of the turbine speed control is extremely fast.

The variable geometry turbine nozzle 96 of the air turbine 94 is in selectable direct flow communication with at least two compressed engine air sources 108 such as a stage of the compressor or a ram duct such as the bypass duct 60. Bleed ports are typically used to bleed compressed engine air from these engine components. Illustrated herein are three compressed engine air sources 108, used for air turbine airflow 95, and one alternative source. A three-way air valve 110 selectively connects the variable geometry turbine nozzle 96 in flow communication with either the bypass duct 60, an interstage bleed 112 of the HPC, or compressor discharge stage bleed 114 of the engine 12. The three-way air valve 110 provides the air turbine airflow 95 to the air turbine 97. CDP or compressor discharge pressure air 118 bled from the compressor discharge stage bleed 114 or interstage HPC bleed air 120 bled from the interstage bleed 112 of the HPC are used in the non-ramjet modes of engine operation. Bypass bleed air 124 bled from the bypass duct 60 is used during the ramjet mode of engine operation. Alternatively, instead of bypass bleed air 124 from the bypass duct 60, ram inlet air 128 bled from the engine inlet duct 16 may use the ramjet mode of engine operation. The interstage bleed 112 includes at least one HPC bleed port 130 which is connected by an HPC bleed duct 132 to the three-way air valve 110. The compressor discharge stage bleed 114 includes at least one CDP bleed port 138 which is connected by a CDP bleed duct 140 to the three-way air valve 110. At least one bypass duct bleed port 134 to the bypass duct 60 is connected by a bypass bleed duct 135 to the three-way air valve 110.

Alternatively, the inlet duct 16 has at least one inlet duct bleed port 142 connected by an inlet bleed duct 144 to the three-way air valve 110.

The air turbine 94 discharges the air turbine airflow 95 through its turbine exit 150 which is in selectable direct flow communication with at least two relatively lower pressure engine air sinks 152 such as exhaust ports 153 located for example in an aft end 154 of the bypass duct 60 and in a divergent section 156 of the exhaust nozzle 82. A two-way air valve 160 selectively connects the turbine exit 150 of the air turbine 94 in exhaust flow communication with either the aft end 154 of the bypass duct 60 or the divergent section 156 of the exhaust nozzle 82. This air turbine exhaust system 158 allows all of the turbine air flow 95 to be returned to the engine exhaust, thus negating the engine net thrust loss which would otherwise occur if the air were dumped overboard.

A constant frequency generator control system 164 for the constant frequency electrical power generator 90 powered by the air turbine 94 and the variable geometry turbine nozzle 96 is illustrated schematically in FIG. 2. A rotational speed sensor 170, such as a monopole pickup, is positioned to measure turbine discharge rotor speed of the air turbine 94. In the exemplary embodiment of the air turbine 94, the rotational speed sensor 170 is positioned to measure rotational speed of the air turbine shaft 92. A rotor speed signal 172 from the rotational speed sensor 170 is filtered and then converted from a frequency signal to an analog signal 174 indicative of rotational speed RPM (rotations per minute), of the air turbine shaft 92 in a converter 176. The analog signal 174 is compared to stored parameters 177 an acceleration and deceleration schedule and speed set point in a comparator 180. A resulting error signal 182 is used by the comparator for compensation and gain which controls a torque motor drive 184 which, in turn, operates an air servo valve 190. The air servo valve powers a pneumatic actuator 192 which adjusts vanes 194 of the variable geometry turbine nozzle 96 (illustrated in FIG. 5). The constant frequency electrical power generator 90 produces AC current 200 which is conducted to a voltage regulator 202 which matches the current to an electrical load 206 of the aircraft and/or other accessories.

Figure 3:
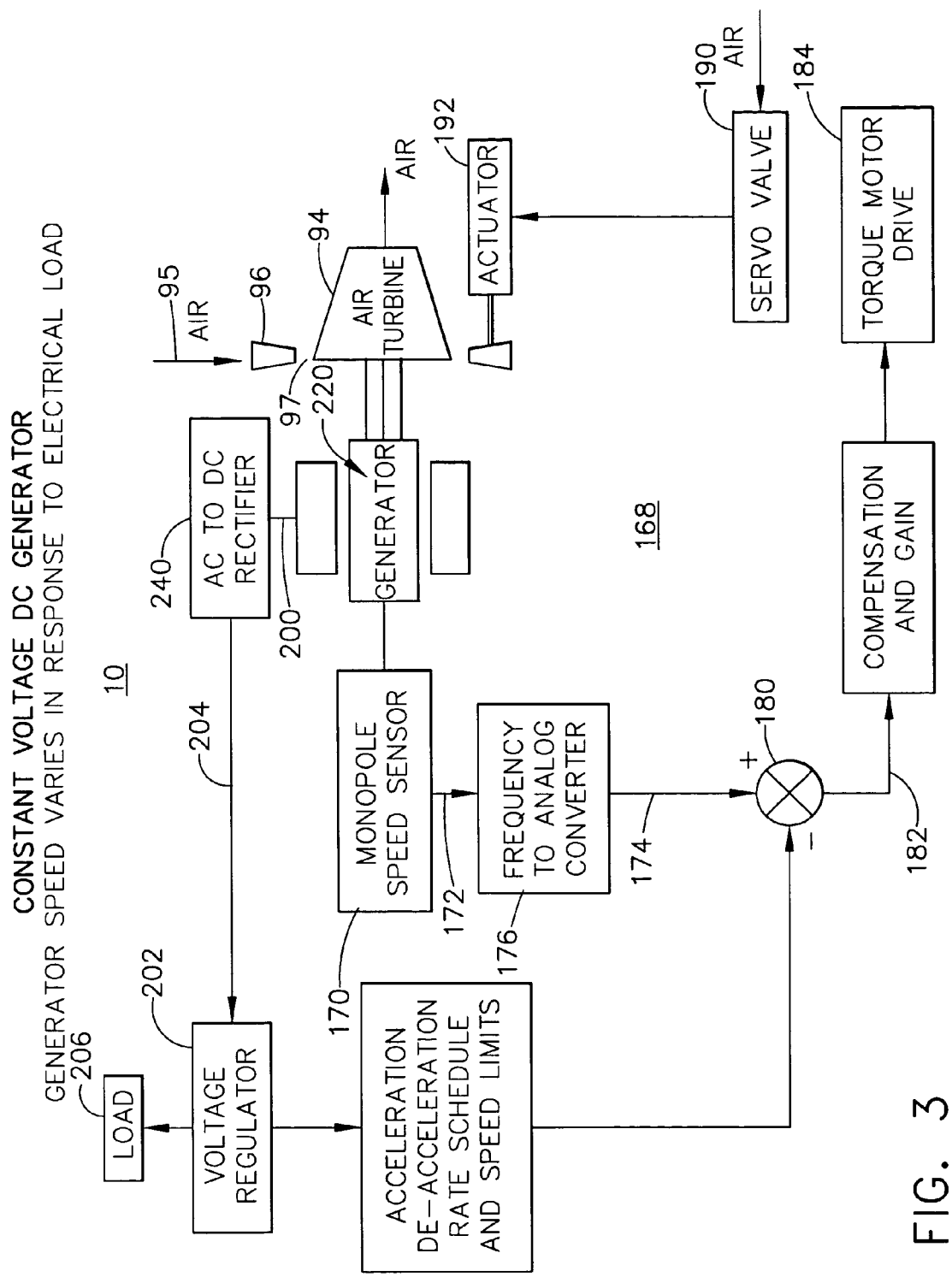
FIG. 3 is a schematical view illustration of an aircraft accessory system with a constant voltage electrical power generator powered by an air turbine such as the one illustrated in FIG. 1.

A constant voltage generator control system 168 for a constant voltage electrical power generator 220 powered by the air turbine 94 and the variable geometry turbine nozzle 96 is illustrated schematically in FIG. 3. A rotational speed sensor 170, such as a monopole pickup, is positioned to measure turbine discharge rotor speed of the air turbine shaft 92. A rotor speed signal 172 from the rotational speed sensor 170 is filtered and then converted from a frequency signal to an analog signal 174 indicative of rotational speed of the air turbine shaft 92 in a converter 176. The analog signal 174 is compared to an acceleration and deceleration schedule and speed limits in a comparator 180. A resulting error signal 182 is used by the comparator for compensation and gain which controls a torque motor drive 184 which, in turn, operates an air servo valve 190. The air servo valve powers a pneumatic actuator 192 which adjusts variable vanes 102 of the variable geometry turbine nozzle 96. The constant voltage electrical power generator 220 produces AC current 200 which is conducted to a rectifier 240 where the current is converted to DC current 204. The DC current 204 is then conducted to a voltage regulator 202 which matches the current to an electrical load 206 of the aircraft and/or other accessories.

Figure 4:
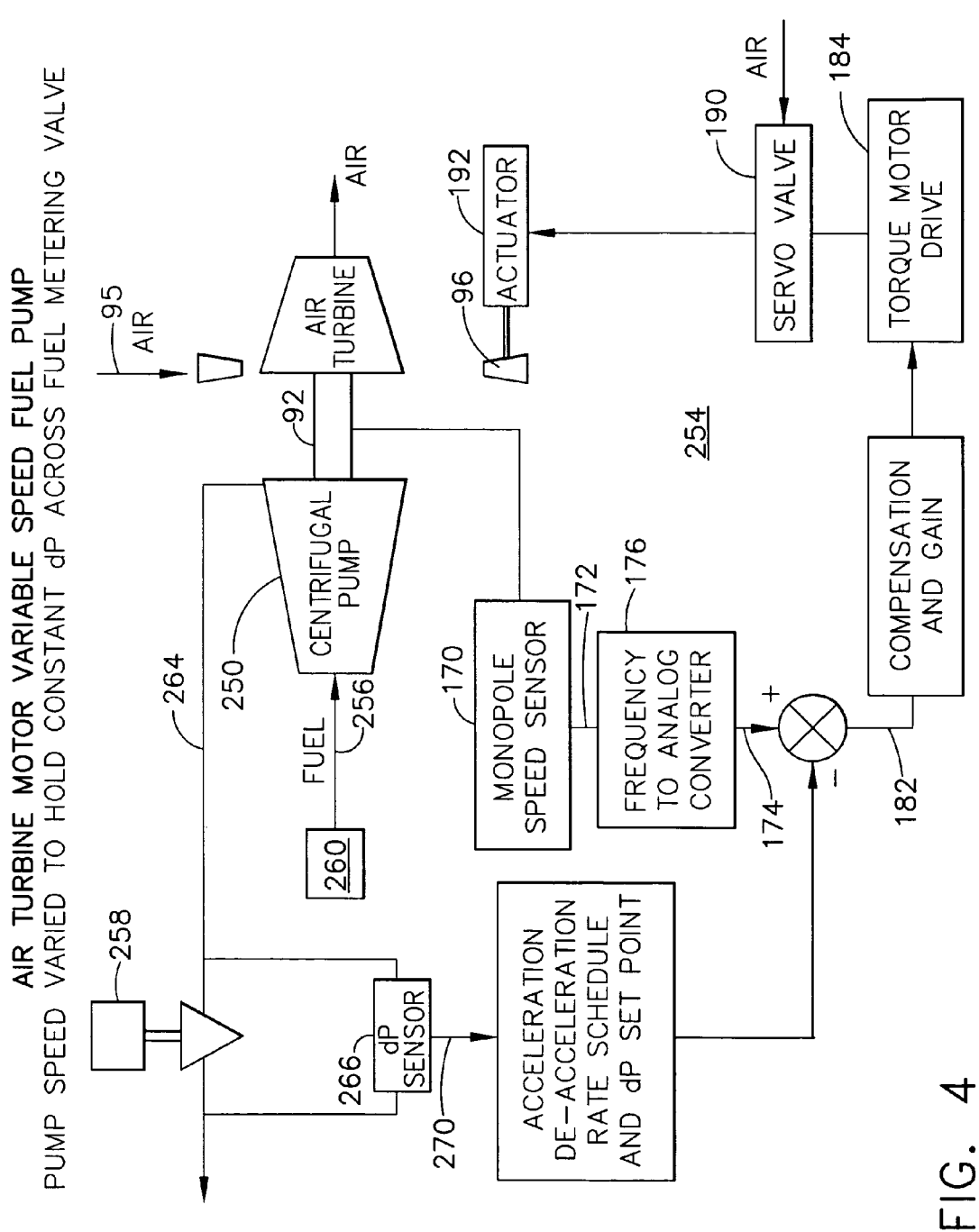
FIG. 4 is a schematical view illustration of an aircraft accessory system with a variable speed centrifugal fuel pump powered by an air turbine such as the one illustrated in FIG. 1.

Illustrated schematically in FIG. 4 is a variable speed centrifugal fuel pump 250 powered by the air turbine 94 which is controlled by the variable geometry turbine nozzle 96. A variable speed centrifugal fuel pump control system 254 is designed to adjust the pump's speed to maintain a constant pressure increase dP (often written $\Delta P$) across a fuel metering valve 258 which is fluid flow receiving communication with the variable speed centrifugal fuel pump 250. A dP sensor 266 measures the pressure decrease dP across the fuel metering valve 258 and sends a dP signal 270 representative of the dP to the comparator 180. A rotational speed sensor 170, such as a monopole pickup, is positioned to measure turbine discharge rotor speed of the air turbine shaft 92. A rotor speed signal 172 from the rotational speed sensor 170 is filtered and then converted from a frequency signal to an analog signal 174 indicative of rotational speed of the air turbine shaft 92 in a converter 176. The analog signal 174 is sent to a comparator 180 where it is compared to an acceleration and deceleration schedule, a pressure decrease dP set point across the fuel metering valve 258, and the dP signal 270 measured by the dP sensor 266. A resulting error signal 182 is used by the comparator for compensation and gain which controls a torque motor drive 184 which, in turn, operates an air servo valve 190. The air servo valve powers a pneumatic actuator 192 which adjusts vanes 102 of the variable geometry turbine nozzle 96. The fuel pump 250 pumps fuel 256 from a fuel source 260 though a fuel line 264 to the fuel metering valve 258.

Figure 6:
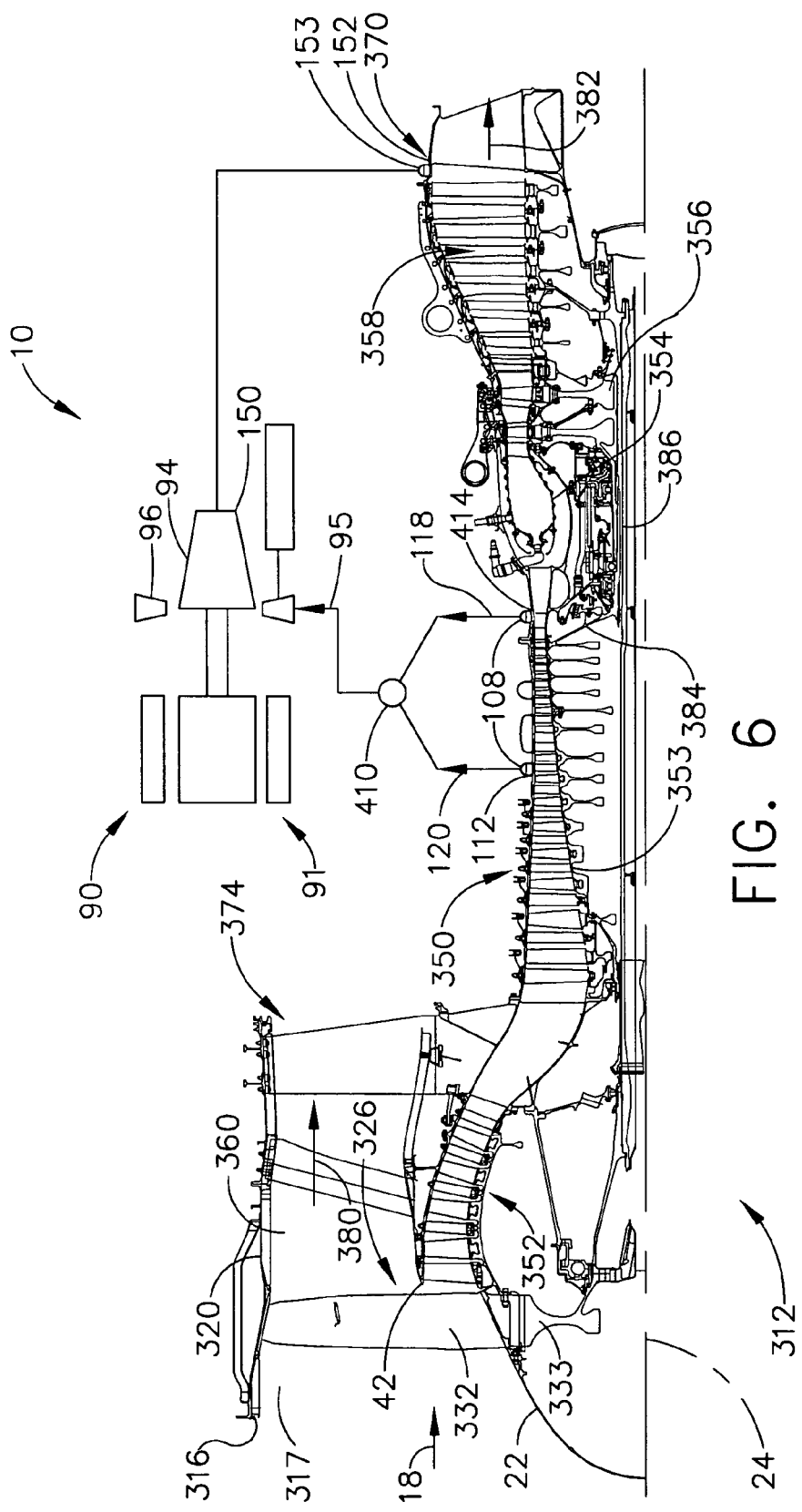
FIG. 6 is a cross-sectional view illustration of a exemplary high bypass turbofan engine with the schematically illustrated direct air turbine driven constant frequency generator.

Other types of aircraft gas turbine engines may use direct air turbine driven accessories 91. Various types of ramjet engines or engines capable of ramjet operation as well as medium and high bypass turbofan engines 12 can be used with the direct air turbine driven accessories 91. One type of ramjet engine is a duct burner with ram burners placed in a bypass duct. Illustrated in cross-section in FIG. 6 is an exemplary high bypass turbofan engine 312 and the schematically illustrated exemplary aircraft accessory system 10 having the direct air turbine driven constant frequency generator 90 representative of direct air turbine driven accessories 91. The engine 312 includes a fan duct 317 extending downstream from an engine inlet 316 and further defined between an outer casing 320 and an inner conical hub 22 both disposed concentrically about a longitudinal centerline axis 24 of the engine 312. The circular inlet is designed for receiving ambient air 18.

The engine 312 further includes, in downstream serial fluid flow communication, a fan section 326 disposed within the fan duct 317, a low pressure compressor (LPC) 352, a core engine 350, and a low pressure turbine (LPT) 358. The fan section 326 includes at least one row of circumferentially spaced apart fan blades 332 mounted on a fan disk 333. An inner casing 340, including a flow splitter 42 at an upstream end thereof, is located immediately downstream of the fan blades 332. A bypass duct 360 is defined between the outer and inner casings 320 and 340, respectively. The core engine 350 includes, in downstream serial flow communication, a high pressure compressor (HPC) 353, a combustor 354, a high pressure turbine (HPT) 356 and, a low pressure turbine (LPT) 358. The HPT 356 is drivingly connected to the HPC 353 by a first rotor shaft 384. The LPT 358 is drivingly connected to the fan disk 333 and the low pressure compressor (LPC) 352 by a second rotor shaft 386.

Directly downstream of the LPT 358 is a core exhaust nozzle 370. A bypass duct exhaust nozzle 374 is defined at a downstream end of the bypass duct 360. Other embodiments of high bypass turbofan engines have long duct nacelles and the bypass duct extends downstream or aftwardly to the LPT where a mixer mixes bypass duct flow 380 with core stream flow 382 exiting from the LPT 358.

The various exemplary aircraft accessory systems 10 described above may be used with the high bypass turbofan engine 312 illustrated in FIG. 6. The variable geometry turbine nozzle 96 of the air turbine 94 is in selectable direct flow communication with at least two compressed engine air sources 108 such as two stages of the HPC 353. Illustrated in FIG. 6 are two compressed engine air sources 108, used for air turbine airflow 95. A two-way air valve 410 selectively connects the variable geometry turbine nozzle 96 in flow communication with either the interstage bleed 112 of the HPC 353 or an HPC compressor discharge stage bleed 414 at the downstream or aft end of the HPC. CDP or compressor discharge pressure air 118 bled from the compressor discharge stage bleed 414 or interstage HPC bleed air 120 bled from the interstage bleed 112 of the HPC are used in during engine operation.

Figure 7:
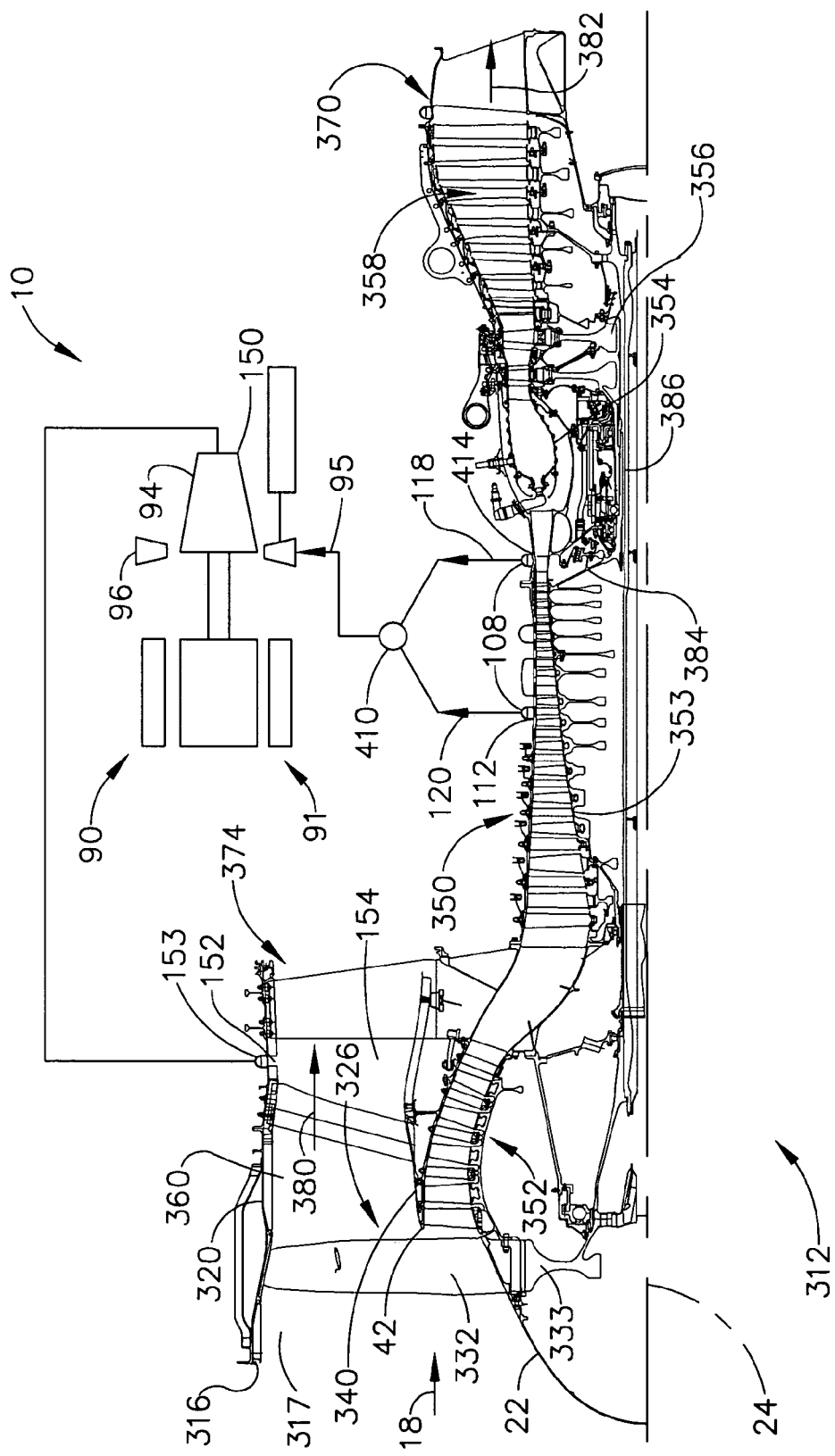
FIG. 7 is a cross-sectional view illustration of the exemplary high bypass turbofan engine with the schematically illustrated direct air turbine driven constant frequency generator illustrated in FIG. 6 with an alternative low pressure engine air sink.

The air turbine 94 discharges the air turbine airflow 95 through its turbine exit 150 which is in direct flow communication with at least one relatively lower pressure engine air sink 152 such as exhaust ports 153 located, for example, in the core exhaust nozzle 370 as illustrated in FIG. 6 or in an aft end 154 of the bypass duct 360 as illustrated in FIG. 7. This allows all of the turbine air flow 95 to be returned to the engine exhaust, thus, negating the engine net thrust loss which would otherwise occur if the air were dumped overboard.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An aircraft accessory system includes:
   an aircraft engine powered direct air turbine driven accessory,
   an air turbine drivingly directly connected by an air turbine shaft to the accessory,
   the air turbine having a variable geometry turbine nozzle, and
   the variable geometry turbine nozzle being in selectable direct flow communication with at least two compressed engine air sources of a single aircraft propulsive engine.

2. A system as claimed in claim 1 further comprising the two compressed engine air sources being an HPC interstage bleed and an HPC compressor discharge stage bleed.

3. An aircraft accessory system includes:
   an aircraft engine powered direct air turbine driven accessory,
   an air turbine driving directly connected by an air turbine shaft to the accessory,
   the air turbine having a variable geometry turbine nozzle,
   the variable geometry turbine nozzle being in selectable direct flow communication with at least two compressed engine air sources,
   the two compressed engine air sources being an HPC interstage bleed and an HPC compressor discharge stage bleed, and
   the variable geometry turbine nozzle being in selectable direct flow communication with a third compressed engine air source wherein the third compressed engine air source is a bypass duct or an engine inlet duct.

4. A system as claimed in claim 1 further comprising the air turbine including a turbine exit in selectable direct flow communication with at least two relatively lower pressure engine air sinks.

5. An aircraft accessory system includes:
   an aircraft engine powered direct air turbine driven accessory,
   an air turbine drivingly directly connected by an air turbine shaft to the accessory,
   the air turbine having a variable geometry turbine nozzle,
   the variable geometry turbine nozzle being in selectable direct flow communication with at least two compressed engine air sources,
   the air turbine including a turbine exit in selectable direct flow communication with at least two relatively lower pressure engine air sinks, and
   a first one of the two relatively lower pressure engine air sinks being located in the aft end of a bypass duct and a second one of the two relatively lower pressure engine air sinks being located in a divergent section of the exhaust nozzle.

6. A system as claimed in claim 5 further comprising the two compressed engine air sources being an HPC interstage bleed and an HPC compressor discharge stage bleed.

7. A system as claimed in claim 6 further comprising the variable geometry turbine nozzle being in selectable direct flow communication with a third compressed engine air source wherein the third compressed engine air source is a bypass duct or an engine inlet duct.

8. A system as claimed in claim 1 wherein the air turbine driven accessory is a constant voltage electrical power generator.

9. An aircraft accessory system includes:
   an aircraft engine powered direct constant voltage electrical power generator,
   an air turbine drivingly directly connected by an air turbine shaft to the constant voltage electrical power generator,
   the air turbine having a variable geometry turbine nozzle,
   the variable geometry turbine nozzle being in selectable direct flow communication with at least two compressed engine air sources, and
   the two compressed engine air sources being an HPC interstage bleed and an HPC compressor discharge stage bleed.

10. A system as claimed in claim 9 further comprising the variable geometry turbine nozzle being in selectable direct flow communication with a third compressed engine air source wherein the third compressed engine air source is a bypass duct or an engine inlet duct.

11. A system as claimed in claim 8 further comprising the air turbine including a turbine exit in selectable direct flow communication with at least two relatively lower pressure engine air sinks.

12. A system as claimed in claim 11 further comprising a first one of the two relatively lower pressure engine air sinks being located in the aft end of a bypass duct and a second one of the two relatively lower pressure engine air sinks being located in a divergent section of the exhaust nozzle.

13. A system as claimed in claim 12 further comprising the two compressed engine air sources being an HPC interstage bleed and an HPC compressor discharge stage bleed.

14. A system as claimed in claim 13 further comprising the variable geometry turbine nozzle being in selectable direct flow communication with a third compressed engine air source wherein the third compressed engine air source is a bypass duct or an engine inlet duct.

15. A system as claimed in claim 8 further comprising a constant voltage generator control system for controlling the constant voltage electrical power generator, the control system including:
    a rotational speed sensor positioned to measure turbine discharge rotor speed of the air turbine and output a rotor speed signal,
    a converter operable to filter and then convert the rotor speed signal from a frequency signal to an analog signal indicative of the turbine discharge rotor speed of the air turbine in RPM,
    a comparator operably connected to the converter for receiving the analog signal, and comparing the analog signal to an acceleration and deceleration schedule and speed limits, and calculating a resulting error signal,
    a torque motor drive operably connected to an air servo valve for powering a pneumatic actuator operably connected to and for adjusting vanes of the variable geometry turbine nozzle, and
    the comparator being operable to use the resulting error signal for effecting compensation and gain of the torque motor drive to adjust the vanes.

16. A system as claimed in claim 15 further comprising a rectifier for converting AC current from the constant voltage electrical power generator to DC current and matching the DC current to an aircraft electrical load.

17. A system as claimed in claim 1 wherein the air turbine driven accessory is a constant frequency electrical power generator.

18. An aircraft accessory system includes:
    an aircraft engine powered direct air turbine driven accessory,
    an air turbine drivingly directly connected by an air turbine shaft to the accessory,
    the air turbine having a variable geometry turbine nozzle, and
    the variable geometry turbine nozzle being in selectable direct flow communication with at least two compressed engine air sources,
    the two compressed engine air sources being an HPC interstage bleed and an HPC compressor discharge stage bleed.

19. A system as claimed in claim 18 further comprising the variable geometry turbine nozzle being in selectable direct flow communication with a third compressed engine air source wherein the third compressed engine air source is a bypass duct or an engine inlet duct.

20. A system as claimed in claim 17 further comprising the air turbine including a turbine exit in selectable direct flow communication with at least two relatively lower pressure engine air sinks.

21. A system as claimed in claim 20 further comprising a first one of the two relatively lower pressure engine air sinks being located in aft end of a bypass duct and a second one of the two relatively lower pressure engine air sinks being located in a divergent section of the exhaust nozzle.

22. A system as claimed in claim 21 further comprising the two compressed engine air sources being an HPC interstage bleed and an HPC compressor discharge stage bleed.

23. A system as claimed in claim 22 further comprising the variable geometry turbine nozzle being in selectable direct flow communication with a third compressed engine air source wherein the third compressed engine air source is a bypass duct or an engine inlet duct.

24. A system as claimed in claim 17 further comprising a constant frequency generator control system for controlling the constant frequency electrical power generator, the control system including:
    a rotational speed sensor positioned to measure turbine discharge rotor speed of the air turbine and output a rotor speed signal,
    a converter operable to filter and then convert the rotor speed signal from a frequency signal to an analog signal indicative of the turbine discharge rotor speed of the air turbine in RPM,
    a comparator operably connected to the converter for receiving the analog signal, and comparing the analog signal to an acceleration and deceleration schedule and a speed set point, and calculating a resulting error signal,
    a torque motor drive operably connected to an air servo valve for powering a pneumatic actuator operably connected to and for adjusting vanes of the variable geometry turbine nozzle, and
    the comparator being operable to use the resulting error signal for effecting compensation and gain of the torque motor drive to adjust the vanes.

25. A system as claimed in claim 24 further comprising a voltage regulator for matching AC current from the constant frequency electrical power generator to an aircraft electrical load.

26. A system as claimed in claim 1 wherein the air turbine driven accessory is a variable speed centrifugal fuel pump.

27. A system as claimed in claim 26 further comprising the two compressed engine air sources being an HPC interstage bleed and an HPC compressor discharge stage bleed.

28. A system as claimed in claim 27 further comprising the variable geometry turbine nozzle being in selectable direct flow communication with a third compressed engine air source wherein the third compressed engine air source is a bypass duct or an engine inlet duct.

29. A system as claimed in claim 26 further comprising the air turbine including a turbine exit in selectable direct flow communication with at least two relatively lower pressure engine air sinks.

30. A system as claimed in claim 29 further comprising a first one of the two relatively lower pressure engine air sinks being located in aft end of a bypass duct and a second one of the two relatively lower pressure engine air sinks being located in a divergent section of the exhaust nozzle.

31. A system as claimed in claim 30 further comprising the two compressed engine air sources being an HPC interstage bleed and an HPC compressor discharge stage bleed.

32. A system as claimed in claim 31 further comprising the variable geometry turbine nozzle being in selectable direct flow communication with a third compressed engine air source wherein the third compressed engine air source is a bypass duct or an engine inlet duct.

33. A system as claimed in claim 26 further comprising a variable speed centrifugal fuel pump control system for controlling a pump speed of the fuel pump to maintain a constant pressure decrease across a fuel metering valve which is fluid flow receiving communication with the fuel pump, the control system including:
    a rotational speed sensor positioned to measure turbine discharge rotor speed of the air turbine and output a rotor speed signal, a converter operable to filter and then convert the rotor speed signal from a frequency signal to an analog signal indicative of the turbine discharge rotor speed of the air turbine in RPM, a comparator operably connected to the converter for receiving the analog signal, and comparing the analog signal to an acceleration and deceleration schedule and a pressure decrease set point across the fuel metering valve, and calculating a resulting error signal, a torque motor drive operably connected to an air servo valve for powering a pneumatic actuator operably connected to and for adjusting vanes of the variable geometry turbine nozzle, and the comparator being operable to use the resulting error signal for effecting compensation and gain of the torque motor drive to adjust the vanes.

34. An aircraft ramjet engine comprising:

in downstream serial fluid communication an annular engine inlet duct, fan duct circumscribing a fan section, a core engine, a low pressure turbine, and an exhaust duct, a bypass duct extending downstream from at least a portion of the fan section around the core engine and the low pressure turbine to an exhaust duct downstream of and in fluid communication with both the core engine and the bypass duct, ram burners operatively disposed in the engine and capable of operating the engine in a ramjet mode, an aircraft engine powered direct air turbine driven accessory, an air turbine drivingly directly connected by an air turbine shaft to the accessory, the air turbine having a variable geometry turbine nozzle, and the variable geometry turbine nozzle being in selectable direct flow communication with at least two compressed engine air sources of the engine.

35. An engine as claimed in claim 34 further comprising the two compressed engine air sources being an HPC interstage bleed and an HPC compressor discharge stage bleed.

36. An aircraft ramjet engine comprising:

in downstream serial fluid communication an annular engine inlet duct, fan duct circumscribing a fan section, a core engine, a low pressure turbine, and an exhaust duct, a bypass duct extending downstream from at least a portion of the fan section around the core engine and the low pressure turbine to an exhaust duct downstream of and in fluid communication with both the core engine and the bypass duct, ram burners operatively disposed in the engine and capable of operating the engine in a ramjet mode, an aircraft engine powered direct air turbine driven accessory, an air turbine drivingly directly connected by an air turbine shaft to the accessory, the air turbine having a variable geometry turbine nozzle, the variable geometry turbine nozzle being in selectable direct flow communication with at least two compressed engine air sources, the two compressed engine air sources being an HPC interstage bleed and an HPC compressor discharge stage bleed, and the variable geometry turbine nozzle being in selectable direct flow communication with a third compressed engine air source wherein the third compressed engine air source is a bypass duct or the inlet duct.

37. An engine as claimed in claim 34 further comprising the air turbine including a turbine exit in selectable direct flow communication with at least two relatively lower pressure engine air sinks.

38. An aircraft ramjet engine comprising:

in downstream serial fluid communication an annular engine inlet duct, fan duct circumscribing a fan section, a core engine, a low pressure turbine, and an exhaust duct, a bypass duct extending downstream from at least a portion of the fan section around the core engine and the low pressure turbine to an exhaust duct downstream of and in fluid communication with both the core engine and the bypass duct, ram burners operatively disposed in the engine and capable of operating the engine in a ramjet mode, an aircraft engine powered direct air turbine driven accessory, an air turbine drivingly directly connected by an air turbine shaft to the accessory, the air turbine having a variable geometry turbine nozzle, the variable geometry turbine nozzle being in selectable direct flow communication with at least two compressed engine air sources, the two compressed engine air sources being an HPC interstage bleed and an HPC compressor discharge stage bleed, the air turbine including a turbine exit in selectable direct flow communication with at least two relatively lower pressure engine air sinks, and a first one of the two relatively lower pressure engine air sinks being located in aft end of a bypass duct and a second one of the two relatively lower pressure engine air sinks being located in a divergent section of the exhaust nozzle.

39. An engine as claimed in claim 38 further comprising the two compressed engine air sources being an HPC interstage bleed and an HPC compressor discharge stage bleed.

40. An engine as claimed in claim 39 further comprising the variable geometry turbine nozzle being in selectable direct flow communication with a third compressed engine air source wherein the third compressed engine air source is a bypass duct or the inlet duct.

41. A bypass turbofan engine comprising:

in downstream serial fluid communication a fan duct circumscribing a fan section, a core engine, a low pressure turbine, a bypass duct extending downstream from at least a portion of the fan section and circumscribing at least a part of the core engine, an aircraft engine powered direct air turbine driven accessory, an air turbine drivingly directly connected by an air turbine shaft to the accessory, the air turbine having a variable geometry turbine nozzle, and the variable geometry turbine nozzle being in selectable direct flow communication with at least two compressed engine air sources of the engine.

42. An engine as claimed in claim 41 further comprising the two compressed engine air sources being an HPC interstage bleed and an HPC compressor discharge stage bleed.

43. An engine as claimed in claim 42 further comprising the air turbine including a turbine exit in selectable direct flow communication with at least one relatively lower pressure engine air sinks.

44. A bypass turbofan engine comprising:
- in downstream serial fluid communication a fan duct circumscribing a fan section, a core engine, a low pressure turbine,
- a bypass duct extending downstream from at least a portion of the fan section and circumscribing at least a part of the core engine,
- an aircraft engine powered direct air turbine driven accessory,
- an air turbine drivingly directly connected by an air turbine shaft to the accessory,
- the air turbine having a variable geometry turbine nozzle,
- the variable geometry turbine nozzle being in selectable direct flow communication with at least two compressed engine air sources,
- the two compressed engine air sources being an HPC interstage bleed and an HPC compressor discharge stage bleed,
- the air turbine including a turbine exit in selectable direct flow communication with at least one relatively lower pressure engine air sinks, and
- the relatively lower pressure engine air sinks being located in aft end of a bypass duct and a second one of the two relatively lower pressure engine air sinks being located in a divergent section of the exhaust nozzle.

* * * * *